United States Patent
Cho et al.

(10) Patent No.: US 6,389,818 B2
(45) Date of Patent: May 21, 2002

(54) METHOD AND APPARATUS FOR INCREASING THE EFFICIENCY OF A REFRIGERATION SYSTEM

(75) Inventors: Young I. Cho, Cherry Hill, NJ (US); Cheolho Bai, Taegu (KR)

(73) Assignee: Vortex Aircon, Inc., Cherry Hill, NJ (US)

(*) Notice: Subject to any disclaimer, the term of this patent is extended or adjusted under 35 U.S.C. 154(b) by 0 days.

(21) Appl. No.: 09/760,232

(22) Filed: Jan. 12, 2001

Related U.S. Application Data

(63) Continuation-in-part of application No. 09/517,922, filed on Mar. 3, 2000, now Pat. No. 6,250,086, and a continuation-in-part of application No. 09/535,126, filed on Mar. 24, 2000, and a continuation-in-part of application No. 09/737,016, filed on Dec. 14, 2000.

(51) Int. Cl.[7] ................ F25B 9/02; F25B 1/00
(52) U.S. Cl. .................................. 62/5; 62/498
(58) Field of Search ..................... 62/5, 498, 467

(56) References Cited

U.S. PATENT DOCUMENTS

| | | | |
|---|---|---|---|
| 2,489,680 A | 11/1949 | Shoemaker et al. | 62/115 |
| 3,600,904 A | 8/1971 | Tilney | 62/196 |
| 3,775,988 A | 12/1973 | Fekete | 62/23 |
| 3,902,876 A | 9/1975 | Moen et al. | 55/348 |
| 4,026,120 A | 5/1977 | Tallant | 62/5 |
| 4,136,528 A * | 1/1979 | Vogel et al. | 62/174 |
| 4,290,791 A | 9/1981 | Matsui et al. | 55/399 |
| 4,302,949 A | 12/1981 | Trimboli Longhetto | 62/402 |
| 4,331,002 A * | 5/1982 | Ladusaw | 62/505 |
| 4,531,371 A | 7/1985 | Voronin et al. | 62/5 |
| 4,747,756 A * | 5/1988 | Sato et al. | 417/307 |
| 5,186,137 A * | 2/1993 | Salzmann | 123/192.2 |
| 5,426,956 A * | 6/1995 | Phillippe | 62/509 |
| 5,704,219 A | 1/1998 | Suzuki et al. | 62/222 |
| 5,706,666 A | 1/1998 | Yamanaka et al. | 62/225 |
| 5,976,227 A | 11/1999 | Lorey | 96/209 |
| 5,996,360 A | 12/1999 | Tanaka et al. | 62/160 |
| 6,006,541 A | 12/1999 | Taylor | 62/453 |
| 6,006,544 A | 12/1999 | Watanabe | 62/511 |
| 6,250,086 B1 * | 6/2001 | Cho et al. | 62/5 |

FOREIGN PATENT DOCUMENTS

| | | |
|---|---|---|
| DE | 832762 | 1/1952 |
| GB | 516375 | 1/1940 |
| GB | 771785 | 4/1957 |
| JP | 5126426 A | 5/1993 |
| JP | 8303879 A | 11/1996 |
| JP | 8313072 | 11/1996 |
| JP | 8313096 A | 11/1996 |
| JP | 8320157 A | 12/1996 |
| JP | 10141792 A | 5/1998 |
| JP | 11193968 A | 7/1999 |

* cited by examiner

*Primary Examiner*—William C. Doerrler
(74) *Attorney, Agent, or Firm*—Mark A. Garzia, P.C.

(57) ABSTRACT

A refrigeration system utilizing a vortex generator and a diffuser to reduce the pressure differential between the head pressure and suction pressure across a compressor.

22 Claims, 11 Drawing Sheets

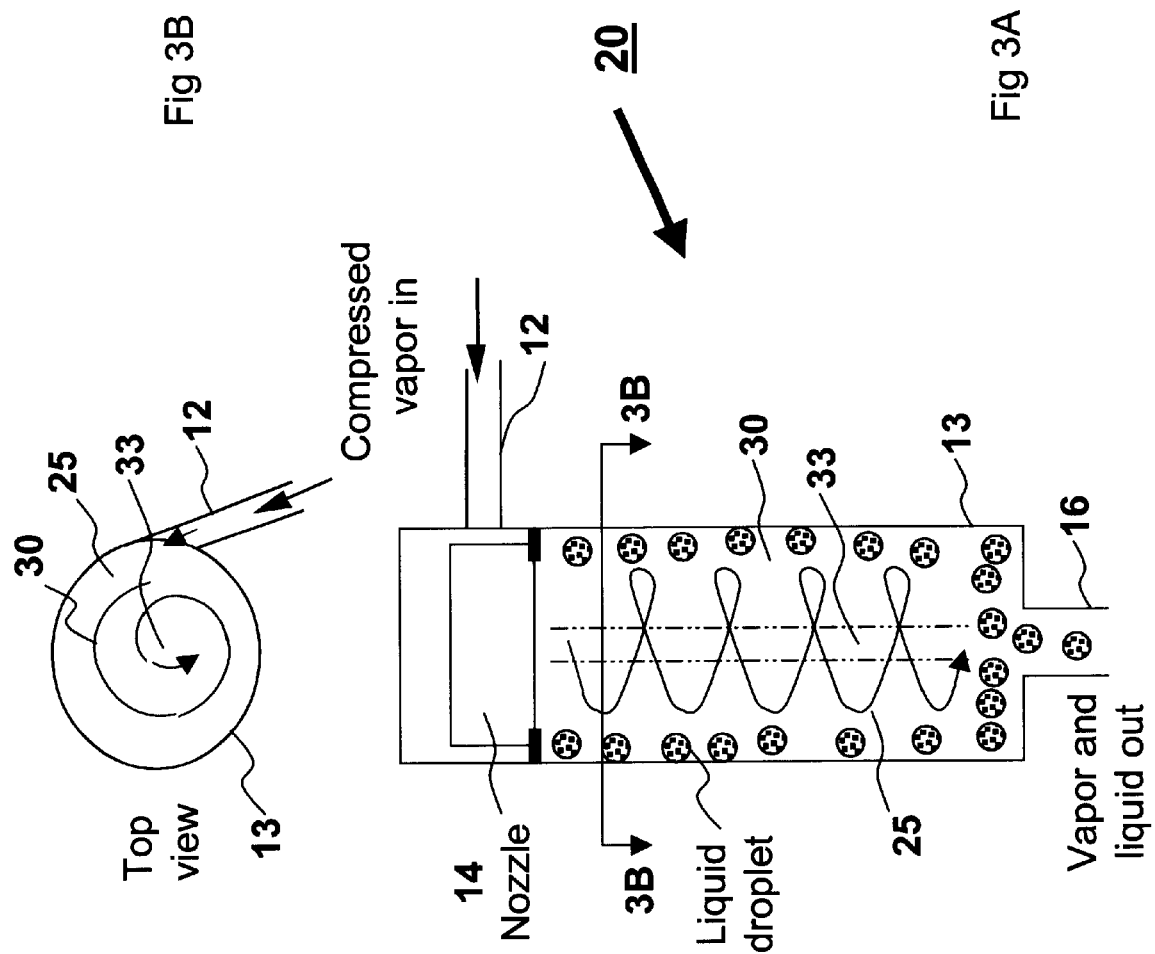

Vortex generator

Step 2: Vapor at core expands and cools, converting to liquid. Volume decreases by a factor of 100, creating vacuum.

Step 3: Liquid is thrown out by the centrifugal force. Vacuum is required for continuous operation of vortex generator.

Step 1: Vortex flow is produced in a vortex generator.

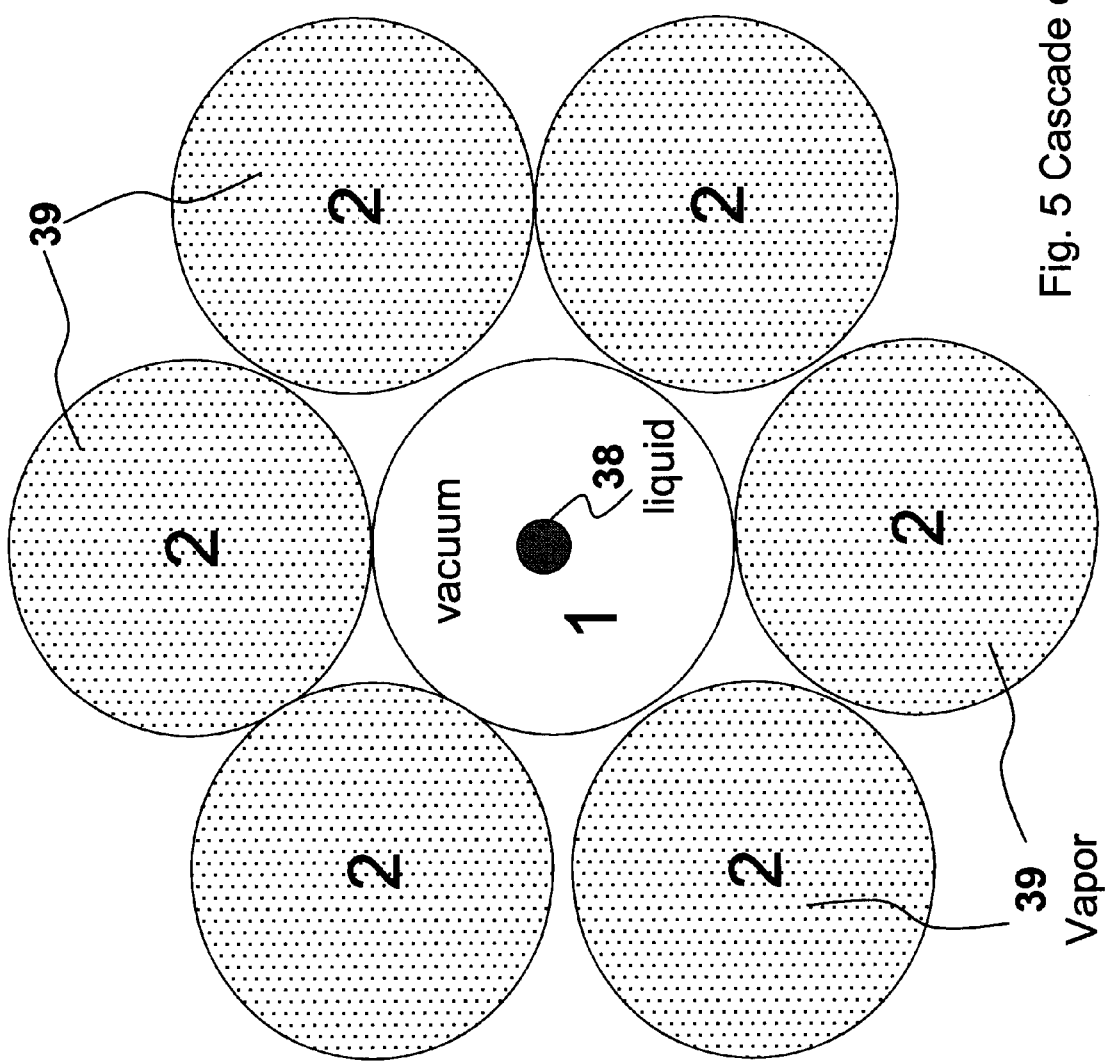
Fig. 5 Cascade effect

METHOD AND APPARATUS FOR INCREASING THE EFFICIENCY OF A REFRIGERATION SYSTEM

CROSS REFERENCE TO RELATED APPLICATIONS

This application is a C-I-P of U.S. application Ser. No. 09/517,922 filed Mar. 3, 2000, now U.S. Pat. No. 6,250,086, issued Jun. 26, 2001, entitled HIGH-EFFICIENCY REFRIGERATION SYSTEM; U.S. application Ser. No. 09/535,126 filed Mar. 24, 2000, entitled HIGH-EFFICIENCY REFRIGERATION SYSTEM; and U.S. application Ser. No. 09/737,016 filed on Dec. 14, 2000, entitled VORTEX GENERATOR, in the names of Young I. Cho and Cheolho Bai, under Express Mail No. EE723809055US.

FIELD OF THE INVENTION

The present invention relates generally to a high efficiency refrigeration system and, more specifically, to a refrigeration system utilizing one or more vortex generators and a diffuser to increase the overall efficiency of a refrigeration system.

BACKGROUND OF THE INVENTION

A refrigeration system typically consists of four major components connected together via a conduit (preferably copper tubing) to form a closed loop system. Referring to FIG. 1, a conventional refrigeration system 500 is illustrated. The four major components are a compressor 52, a condenser 54, an expansion device 56 and an evaporator 58. A refrigerant circulates through the four components via the conduit 59 and will have its pressure either increased or decreased, and its temperature either increased or decreased by the four components.

The refrigerant is continuously cycled through the refrigeration system. The main steps in the refrigeration cycle are compression of the refrigerant by the compressor 52, heat rejection of the refrigerant in the condenser 54, throttling of the refrigerant in the expansion device 56, and heat absorption of the refrigerant in the evaporator 58. This process is sometimes referred to as a vapor-compression refrigeration cycle. The compressor 52 includes a motor (usually an electric motor) and provides the energy to keep the refrigerant moving within the conduits and through the major components.

The vapor-compression refrigeration cycle is the principle upon which conventional air conditioning systems, heat pumps, and refrigeration systems are able to cool and dehumidify air in a defined volume (e.g., a living space, a vehicle, a freezer, etc.) The vapor-compression cycle is made possible because the refrigerant is a condensible gas and exhibits specific properties when it is placed under varying pressures and temperatures.

During the refrigeration cycle, the refrigerant enters the compressor as saturated vapor and is compressed to a very high pressure. The temperature of the refrigerant increases during the compression step. The refrigerant leaves the compressor as superheated vapor and enters the condenser.

A typical condenser comprises a single conduit formed into a serpentine-like shape so that a plurality of rows of conduit are formed parallel to each other. Metal fins or other aids are usually attached to the outer surface of the serpentine conduit in order to increase the transfer of heat between the superheated refrigerant vapor passing through the condenser and the ambient air. Heat is rejected from the superheated vapor as it passes through the condenser and the refrigerant exits the condenser as a saturated or subcooled liquid.

The expansion device reduces the pressure of the liquid refrigerant thereby turning it into a saturated liquid-vapor mixture, which is throttled to the evaporator. In order to reduce manufacturing costs, the expansion device is typically a capillary tube in small air conditioning systems. The temperature of the refrigerant drops below the temperature of the ambient air as it passes through the expansion device. The refrigerant enters the evaporator as a low quality saturated mixture comprised of approximately 20% vapor and 80% liquid. ("Quality" is defined as the mass fraction of vapor in the liquid-vapor mixture.)

The evaporator physically resembles the serpentine-shaped conduit of the condenser. Ideally, the refrigerant completely evaporates by absorbing heat from the defined volume to be cooled (e.g., the interior of a refrigerator) and leaves the evaporator as saturated vapor at the suction pressure of the compressor and reenters the compressor thereby completing the cycle.

The efficiency of a refrigeration cycle is traditionally described by an energy-efficiency ratio (EER). It is defined as the ratio of the heat absorption from an evaporator to the work done by a compressor.

$$EER = \frac{\text{Heat absorption from evaporator}}{\text{Work done by compressor}}$$

In a typical air conditioning system, the refrigeration cycle has an EER of approximately 3.0 (kw/kw). As can be seen from the EER equation, the efficiency of the refrigeration system increases by decreasing the work performed by the compressor.

Vortex tubes are well known. Typical vortex tubes are designed to operate with non-condensible gas such as air. A typical vortex tube turns compressed air into two air streams, one of relatively hot air and the other of relatively cold air. A common application for prior vortex tubes is in air supply lines and other applications which utilize gas under a high pressure.

A vortex tube does not have any moving parts. A vortex tube operates by imparting a rotational vortex motion to an incoming compressed air stream; this is done by directing compressed air into an elongated channel in a tangential direction.

SUMMARY OF THE INVENTION

The present invention increases the efficiency of a refrigeration, air conditioning or heat pump system by increasing the efficiency of the refrigeration cycle. The increase in the efficiency is achieved by utilizing a diffuser that communicates with a compressor to reduce the pressure differential across the compressor and a vortex generator to assist in the conversion of the refrigerant from vapor to liquid at specific points in the refrigeration cycle.

A vortex generator is designed to work specifically with condensible vapors such as refrigerants. In one embodiment, a vortex generator is placed between the expansion device and the evaporator in order to increase the percentage of refrigerant entering the evaporator as a liquid, and a diffuser is placed between the vortex generator and the compressor in order to increase the pressure of vapor refrigerant before the vapor enters the compressor, which will reduce the pressure differential across the compressor. As a result, the compression ratio at the compressor decreases, and the work required by the compressor is reduced, thus increasing the efficiency (EER) of the refrigeration cycle.

Since the heat absorption from the evaporator occurs through the evaporation of the liquid refrigerant, an increase in the percentage of the liquid refrigerant entering the evaporator increases the efficiency (EER) of the refrigeration cycle and reduces the size of the evaporator for the same BTU output (i.e., cooling capacity) refrigeration system.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings:

FIG. 3A is a side cross-sectional view of a single-inlet, single-outlet vortex generator utilizing a tangential feed in the nozzle;

FIG. 3B is a top cross-sectional view of the vortex generator shown in FIG. 3A;

FIG. 5 is a representation of the cascade effect produced inside of a vortex generator in accordance with the present invention;

DETAILED DESCRIPTION OF PREFERRED EMBODIMENTS

In describing preferred embodiments of the invention, specific terminology will be selected for the sake of clarity. However, the invention is not intended to be limited to the specific terms so selected, and it is to be understood that each specific term includes all technical equivalents that operate in a similar manner to accomplish a similar purpose.

Preferred embodiments of the present invention will now be described in detail with reference to the accompanying drawings in which a refrigeration system in accordance with the present invention is generally indicated at 10.

Figure 1:
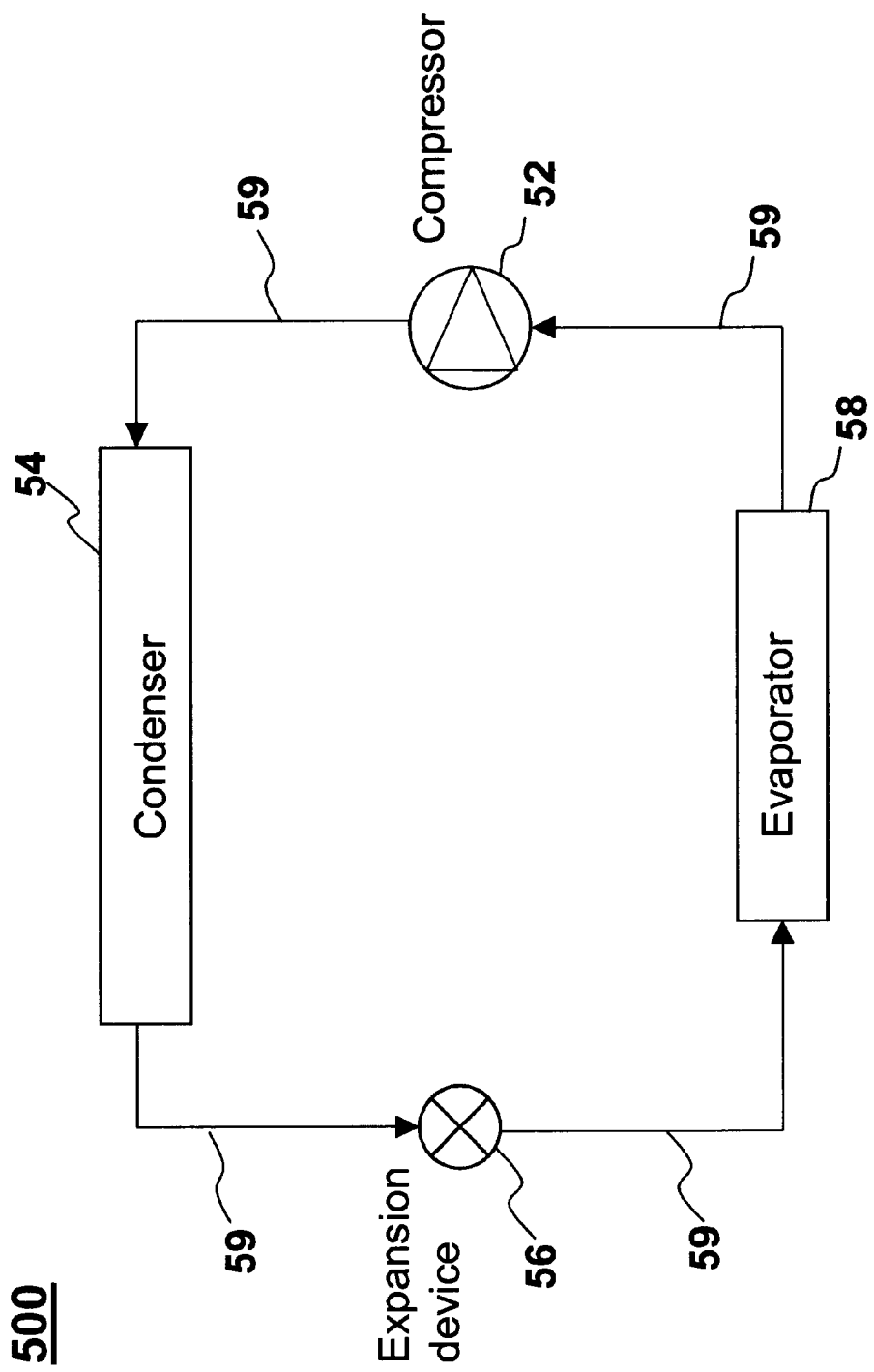
FIG. 1 is a block diagram of a conventional refrigeration system.

A typical refrigeration system 500 is illustrated in FIG. 1. The refrigeration system includes a compressor 52, a condenser 54, an expansion device 56 and an evaporator 58. The various components are connected together via a conduit (usually copper tubing) 59.

The refrigeration system 500 is a closed loop system that continuously circulates a refrigerant through the various elements. The refrigerant is a condensible vapor. Some common types of refrigerant include R-12, R-22, R-134A, R-410A, ammonia, carbon dioxide and natural gas. The main steps in the refrigeration cycle are compression of the refrigerant by the compressor 52, heat rejection of the refrigerant in the condenser 54, throttling of the refrigerant in the expansion device 56, and heat absorption of the refrigerant in the evaporator 58. As indicated previously, this process is referred to as the vapor compression refrigeration cycle.

The efficiency of a refrigeration cycle (and by analogy a heat pump cycle) depends primarily on the heat absorption from the evaporator 58 and the efficiency of the compressor 52. The former depends on the percentage of liquid in the liquid-vapor refrigerant mixture before the evaporator, whereas the latter depends on the magnitude of the pressure differential across the compressor.

A compressor is a device to increase pressure from low to high values by compressing gas or vapor, which is usually done by consuming electric energy. The pressure of the refrigerant as it enters the compressor is referred to as the suction pressure level and the pressure of the refrigerant as it leaves the compressor is referred to as the head pressure level. Depending on the type of refrigerant used, the head pressure can range from about 170 PSIG (i.e., 11.6 atm) to about 450 PSIG (i.e., 30.6 atm).

Compression ratio is the term used to express the pressure ratio between the head pressure and the suction pressure. Compression ratio is calculated by converting the head pressure and the suction pressure onto an absolute pressure scale and dividing the head pressure by the suction pressure. When the compression ratio increases, the compressor efficiency drops thereby increasing energy consumption.

The work of a compressor, W, is mathematically defined as:

$$W = \int_1^2 v dP$$

where v is specific volume, P is pressure, subscripts 1 and 2 indicate inlet (suction side) and outlet (discharge side), respectively. As indicated by the above equation, the compressor work is proportional to pressure differential, $\Delta P$ or $P_2 - P_1$.

The compressor work in a typical refrigeration system can be simplified for an isentropic process as:

$$W = \frac{kRT_1}{k-1}\left[\left(\frac{P_2}{P_1}\right)^{(k-1)/k} - 1\right]$$

where k is a specific heat ratio, R is a gas constant, and T is temperature. As depicted in the above equation, the compressor work can be reduced by reducing the pressure differential, $P_2-P_1$ or compression ratio, $P_2/P_1$ As the compressor work is reduced, the EER (energy efficiency ratio) increases because EER is defined as the ratio of the heat absorption at the evaporator to compressor work.

When a compressor runs at a high compression ratio, the compressor efficiency decreases and the compressor work increases. As the compressor efficiency drops, more electricity is used for less refrigeration. Furthermore, running the compressor at a high compression ratio increases the wear and tear on the compressor and decreases its operating life.

An evaporator 58 is made of a long coil or a series of heat transfer panels which absorb heat from a volume of air that is desired to be cooled. In order to absorb heat from this ambient volume, the temperature of the refrigerant must be lower than that of the volume to be cooled. The refrigerant exiting the expansion device consists of low quality vapor, which is approximately 20% vapor and 80% liquid in a typical refrigeration system.

The liquid portion of the refrigerant is used to absorb heat from the desired volume as the liquid refrigerant evaporates inside the evaporator. The vapor portion of the refrigerant is not utilized to absorb heat from the ambient volume. In other words, the vapor portion of the refrigerant does not contribute to cooling the ambient volume and decreases the efficiency of the refrigeration cycle.

Referring again to FIG. 2, the present invention utilizes a vortex generator 60 between the expansion device 56 and the evaporator 58. Vortex generator 60 converts at least a portion of the refrigerant vapor that exits the expansion device 56 into liquid so that it can be used in the evaporator 58 to absorb heat from the ambient volume.

Vortex tubes are well-known in other areas of art but are not commonly found in refrigeration systems. Vortex tubes are specifically designed for use with non-condensible gases such as air. Vortex tubes separate the non-condensible gas into a relatively hot vapor stream and a relatively cool vapor stream.

A vortex generator is new and is specifically designed for use with condensible vapors such as refrigerants. Vortex generators are more fully disclosed and described in our co-pending U.S. application Ser. No. 09/737,016 filed on Dec. 14, 2000 entitled VORTEX GENERATOR. U.S. application Ser. No. 09/737,016 is hereby incorporated by reference as if set forth fully herein; however, a description follows.

FIG. 3A is a cross-sectional view of a "basic" vortex generator 20 in accordance with the present invention. The vortex generator 20 includes an elongated or longitudinal chamber 30, an inlet 12, a nozzle 14, and an outlet 16. Its single inlet and its single outlet usually identify this embodiment of a vortex generator 20.

Although the longitudinal chamber 30 is shown as substantially tubular in shape and is defined by sidewall 13, it is believed that other designs (e.g., oval) may be utilized.

Condensible vapor enters the vortex generator 20 at inlet 12. The condensible vapor is under a high pressure (i.e., compressed). The nozzle 14 is fixed with respect to the sidewall 13 of the longitudinal chamber 30; there are no moving parts in the vortex generator 20. The nozzle 14 is designed to direct the incoming vapor in a tangential direction with respect to the sidewall 13 of the longitudinal chamber 30.

As a result of the injection of vapor in a tangential direction, a vortex-shaped vapor stream 25 is produced within the longitudinal chamber 30. The vortex-shaped vapor stream 25 (sometimes referred to as cyclonic- or spiral-shaped) created by the nozzle 14 is illustrated in FIGS. 3A and 3B. The operation of the nozzle 14 will be more thoroughly discussed in connection with the description of FIGS. 6A, 6B and 6C.

Referring now to FIG. 3B, near the core region 33 (i.e., parallel to the longitudinal axis) of the elongated chamber, a forced vortex flow is generated, where circumferential velocity linearly increases with the radial distance. Outwards from the core region, there is a free vortex, where circumferential velocity exponentially decreases along the radial distance. The vortex 25 has the general appearance of a spiral.

Figure 4B:
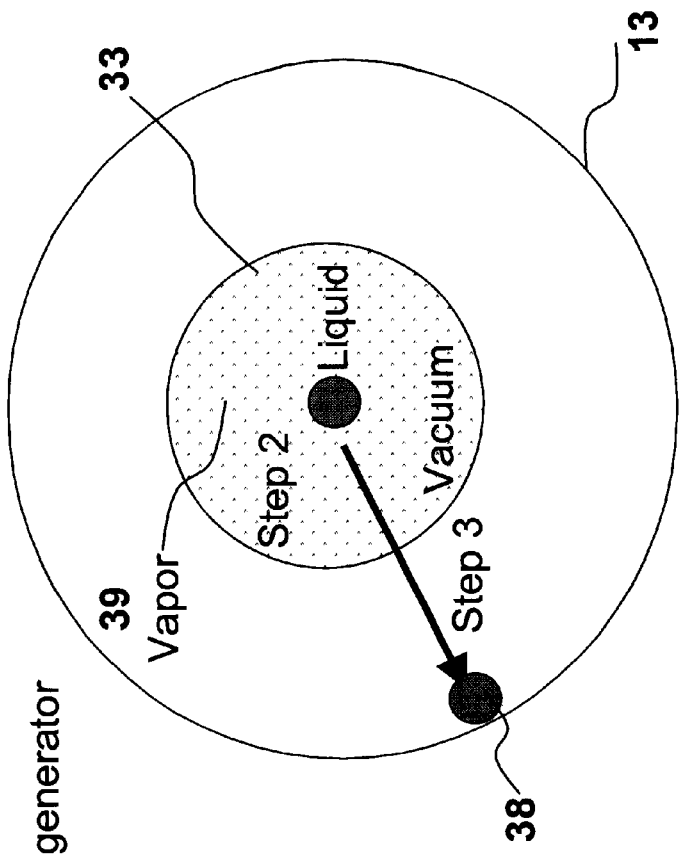
FIGS. 4A and 4B are diagrammatic representations illustrating the principle of phase-changing of the vapor inside the vortex generator of the present invention.
Figure 4A:
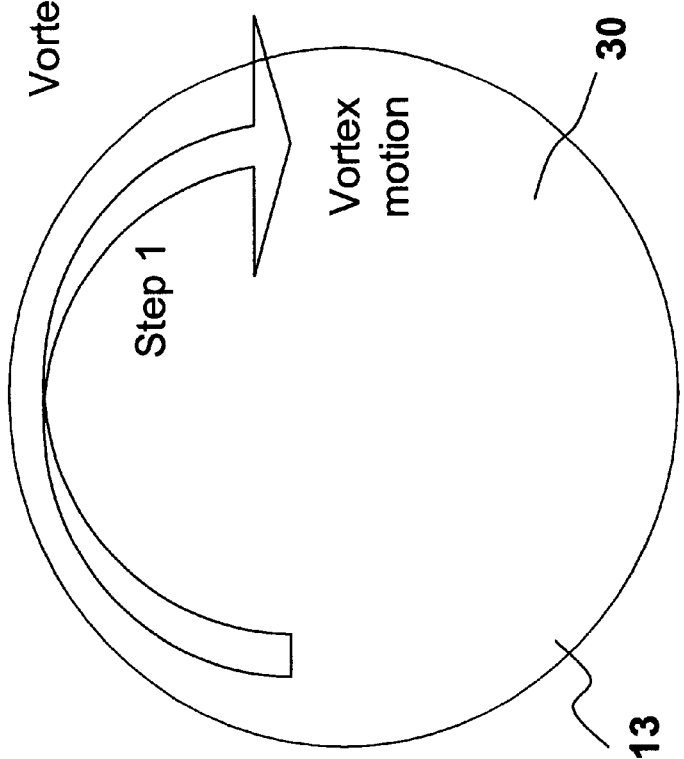

Referring now to FIGS. 4A and 4B, the vapor at the core expands due to the centrifugal force, thus reducing its temperature. In comparison, the vapor at the outer region is compressed as the vapor is pushed toward the sidewall by the centrifugal force, thus resulting in an increased temperature.

As condensible vapor enters a vortex generator 20, the vapor at the core of the vortex generator 20 expands due to the vortex flow motion of the vapor, resulting in a localized drop in pressure. Subsequently, its temperature also drops, converting the condensible vapor to liquid (phase change). Initially, relatively small droplets of liquid are formed. As the phase change of the condensible vapor occurs, the volume of the condensible vapor shrinks because the volume of liquid is significantly smaller than that of vapor. For example, the volume of liquid water is about 1,000 times smaller than that of water vapor (i.e., steam). For typical refrigerants, such as R-22 and R-134a, the volume of the liquid is approximately 80–100 times smaller than that of the vapor.

As a result of the vapor-liquid conversion, the volume of the condensible vapor decreases, prompting a significant drop in the local pressure. This sudden drop in pressure is essentially the same as what happens when the vapor suddenly expands. The sudden drop in the pressure accompanies a corresponding temperature drop, causing additional condensation around the initial condensed droplet. As a result, the condensible vapor is separated into a relatively cool liquid 38 and relatively hot vapor 39 as shown in FIG. 5.

Figure 6A:
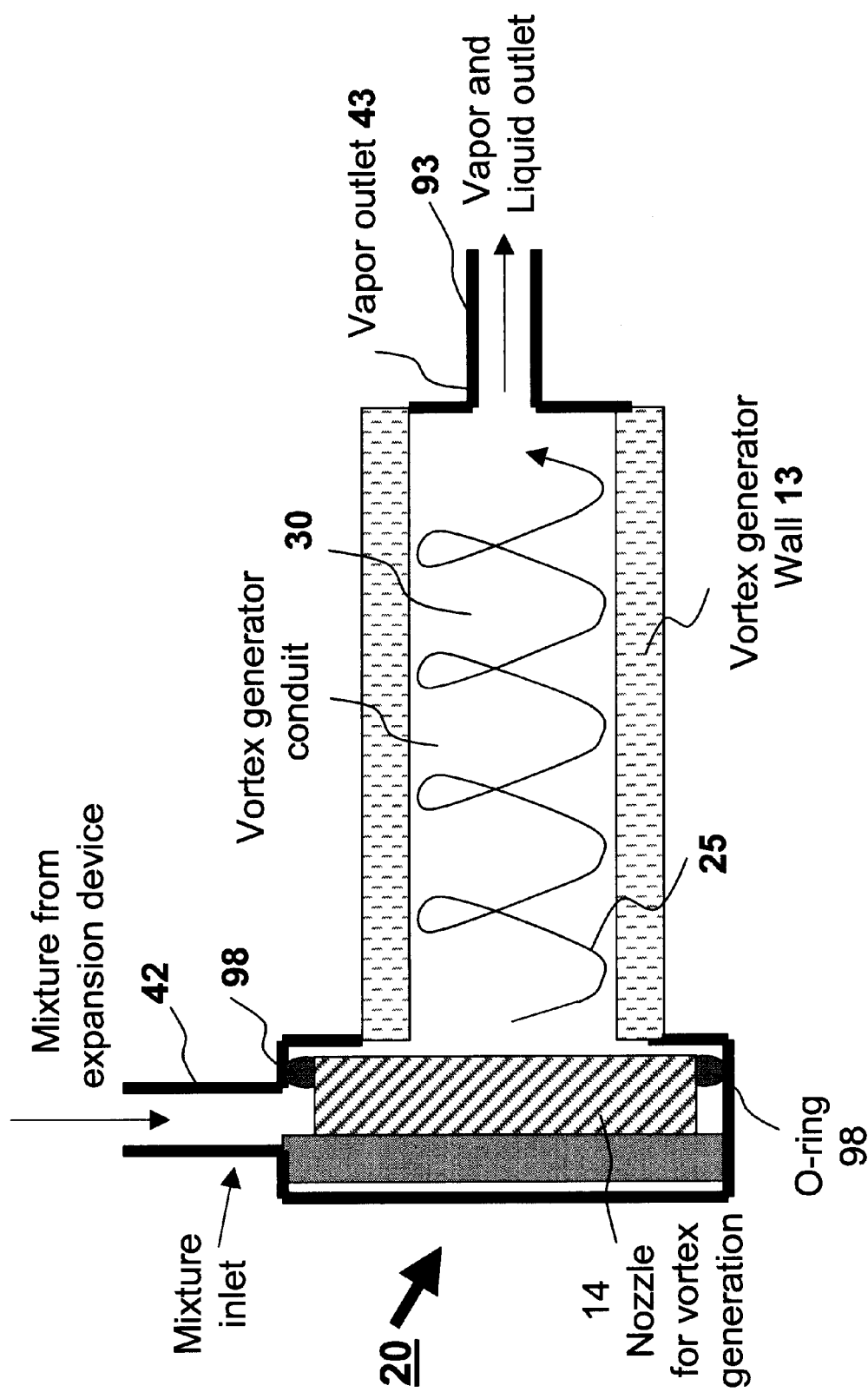
FIG. 6A is a more detailed view of the single-inlet, single outlet vortex generator illustrated in FIG. 3A.

Referring now to FIG. 6A, an enlarged cross-sectional view of the vortex generator 20 illustrated in FIGS. 3A and 3B is shown. The outlet 43 may just be an open end to the longitudinal chamber; however, as illustrated in FIG. 6A, an extension 93 may be used. Condensible vapor enters the vortex generator at inlet 42 at one end, and both condensed liquid and the remaining vapor exit through the other end. The nozzle 14 is used to guide the condensible vapor into the vortex generator tangentially at the inlet so that the vapor can form a vortex flow in the longitudinal chamber 30 of the vortex generator. An O-ring 98 may be used to assist in securing the nozzle 14 within the vortex generator 20 and to ensure that all of the condensible vapor enters the elongated chamber 30 tangentially.

Figure 6C:
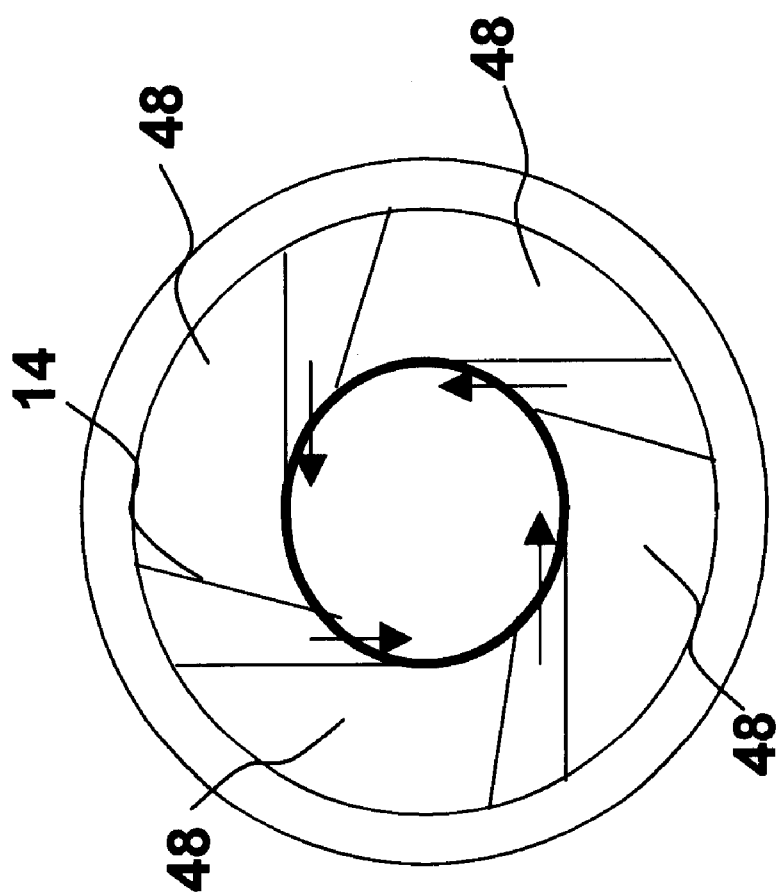
FIG. 6C is an end view, of a nozzle used in the vortex generator of FIG. 6A.
Figure 6B:
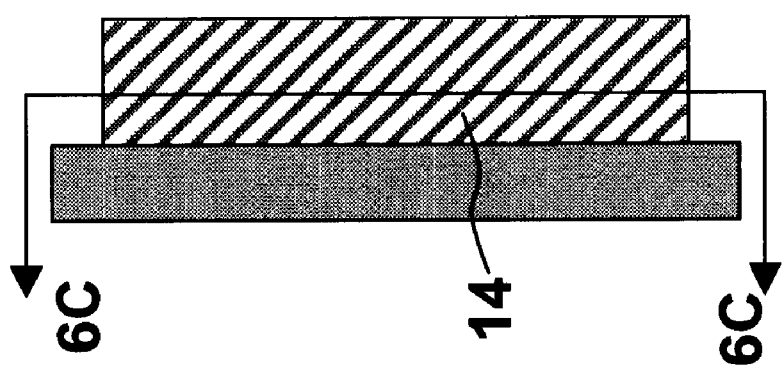
FIGS. 6B is a side view.

The design of the nozzle 14 is shown in FIGS. 6B and 6C. A plurality of guide vanes 48 direct the tangential entry of the vapor into the longitudinal chamber 30 of the vortex generator.

Referring again to FIGS. 4A and 4B, the principle of the phase-change within a vortex generator 20 is discussed. The condensation of condensible vapor inside a vortex generator 20 may be summarized in three steps. Step One, as illustrated in FIG. 4A, shows the vortex flow created by a nozzle 14 at the inlet of a vortex generator 20. Step Two, as illustrated in FIG. 4B, shows the vapor-to-liquid phase change and the creation of a vacuum in the core region; Step Three, also illustrated in FIG. 4B, shows the movement of a liquid droplet from the core to the sidewall of the vortex generator, which is the result of centrifugal force.

Liquid production as a result of a cascade effect inside a vortex generator will now be described. Referring again to FIG. 5, the portion of a condensible vapor is represented by region 1, having a temperature that reaches (or drops below) its saturation temperature due to the vortex motion near the inlet of the vortex generator. The vapor converts to liquid in region 1, causing the pressure in the adjacent area (indicated by 2) to drop, prompting a temperature drop and subsequent vapor-liquid conversion. Subsequently, the pressure in region 2 suddenly drops, and the vapor around region 2 is affected by the vacuum, prompting further vapor-liquid conversion. This cascade effect accelerates vapor-liquid conversion in the vortex generator.

The cascade effect is self-sustaining once the first liquid droplet is produced due to the vortex flow motion. In other words, if the vortex motion cannot be maintained, then cold and hot vapor become mixed, and the cascade effect of self-sustaining vapor-liquid conversion stops. In summary, one has to maintain the vortex flow structure to sustain this cascade process.

Figure 7:
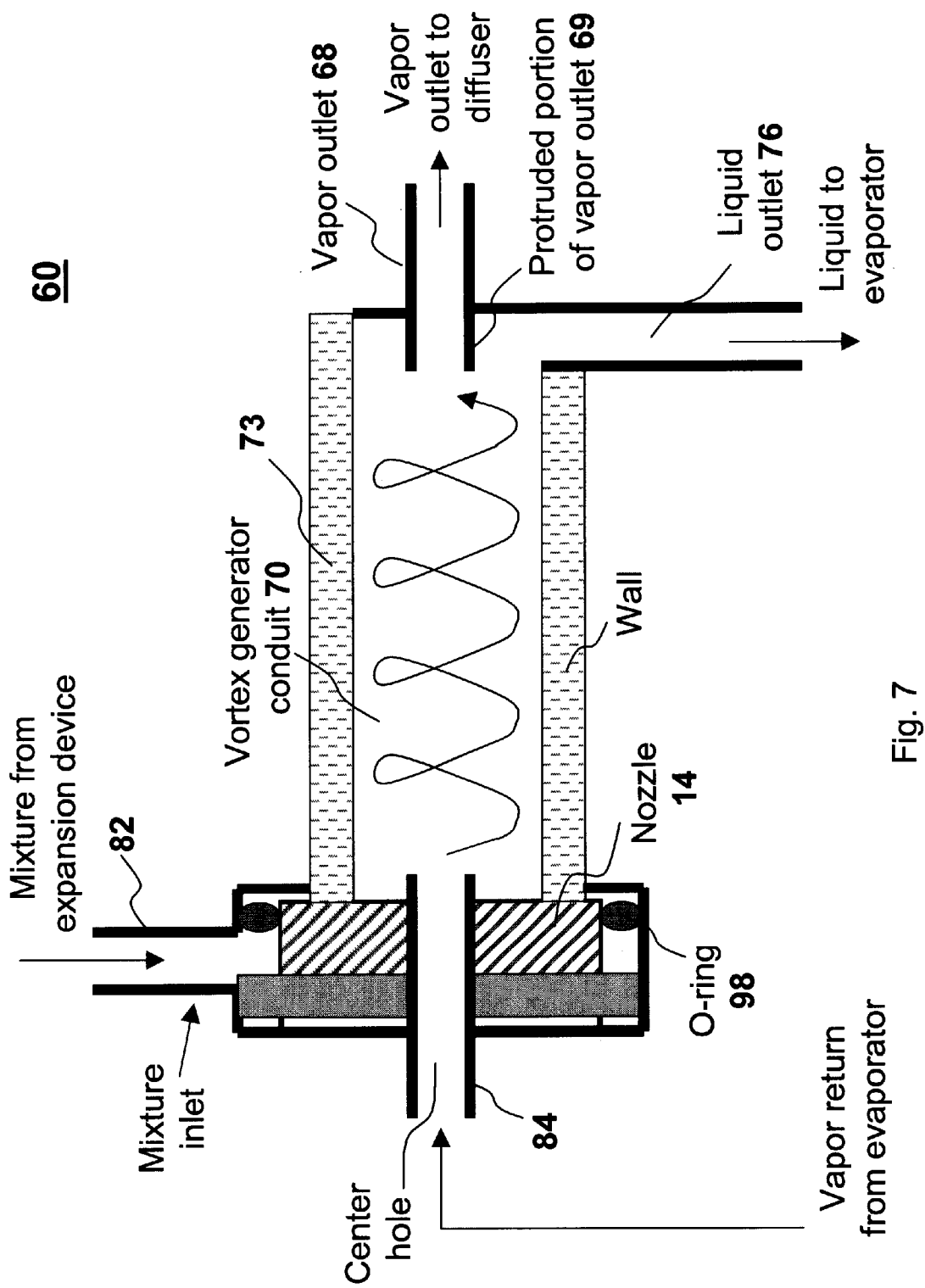
FIG. 7 is a cross-sectional side view of another embodiment of a vortex generator in accordance with the present invention using two inlets and two outlets.

FIG. 7 illustrates an alternate embodiment of a vortex generator 60. Vortex generator 60 has two inlets and two outlets. The first inlet 82 is similar to the inlet of the vortex generator 20 illustrated in FIGS. 3 and 6A. The second inlet 84 is designed to intake heated vapor refrigerant directly into the core of the vortex generator. The second inlet 84 is sometimes referred to as a center delivery inlet. In this vortex generator 60, the nozzle 14 will have a central opening to accommodate the second inlet 84.

At the second inlet 84, there is a vacuum produced by the vortex flow motion of refrigerant inside the vortex generator 60. This vacuum is sufficient enough to pull the vapor exiting from the evaporator 58. (See FIGS. 2 and 7.) The present invention introduces a method to recirculate or regenerate the refrigerant vapor from evaporator 58 to vortex generator 60 using the core vacuum created by the vortex flow motion.

The vortex generator 60 has a vapor outlet 68. The vapor outlet 68 has a portion 69 that protrudes into the longitudinal chamber of the vortex generator 60 in order to prevent any liquid droplets from leaving vortex generator 60 through the vapor outlet. The liquid outlet 76 allows the liquid to escape the vortex generator 60.

Referring again to FIG. 2, a vortex generator 60 is placed into the closed loop refrigeration system after the expansion device 56. Refrigerant vapor-liquid mixture exits the expansion device 56 and enters the vortex generator 60 at the first or tangential inlet 82. The high pressure refrigerant mixture stream produces a strong vortex flow in the vortex generator 60. The vortex flow is similar in shape to a helix or spiral. The high pressure refrigerant mixture separates into a vapor stream and a liquid stream both moving downstream along the helical path. From the vortex flow, the vapor stream gains a high velocity on the order of 100 m/s.

Referring again to FIG. 2, the vortex generator 60 is also preferably placed proximate the evaporator 58. The liquid outlet of the vortex generator 60 is connected to the inlet of the evaporator 58. The vapor outlet 68 of the vortex generator is connected to the inlet of diffuser 31.

Figure 2:
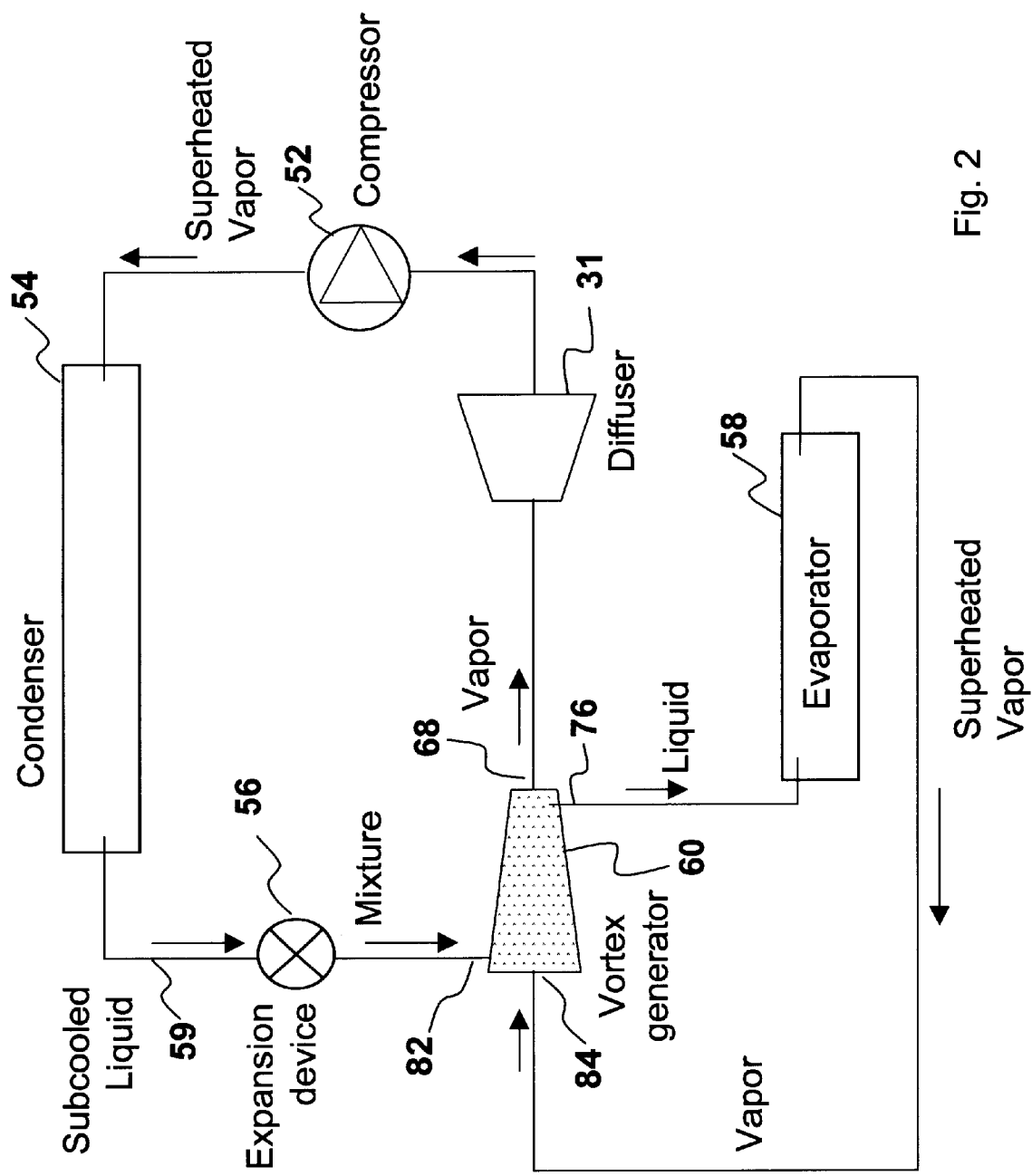
FIG. 2 is a block diagram of a refrigeration system utilizing a vortex generator and a diffuser in accordance with the present invention.

The present invention utilizes a diffuser 31, as illustrated in FIG. 2, between the vortex generator and the compressor 52. A diffuser is a device that increases the pressure of a fluid by slowing it down. The total energy of any fluid entering a diffuser remains unchanged as long as there is no energy loss (i.e., friction) inside the diffuser. As a fluid with a high flow velocity enters the diffuser, the total energy is made up of mostly kinetic energy. As the fluid slows down due to the gradual increase in the cross-sectional area of the diffuser, the kinetic energy decreases, while the pressure the terms "mechanical" or "flow" energy are used in thermodynamics) increases. Thus, the sum of the kinetic energy and flow energy (i.e., pressure) is always unchanged. This is what is known as the first law of thermodynamics or the conservation of energy principle. In fluid mechanics, it is known as Bernoulli's equation.

In order to make a more energy efficient refrigeration system, we want to increase the evaporator-side pressure and decrease the condenser-side pressure. The goal is to reduce the compressor work. The best way to reduce the compressor work is to reduce the pressure differential between condenser-side and evaporator-side, which is exactly what we want to accomplish with the diffuser.

The diffuser 31 increases the pressure of the refrigerant by decreasing the velocity of the refrigerant before it enters the compressor. In this manner, the suction pressure of the compressor increases, thereby decreasing the work of the compressor, and increasing EER. Also, this design only allows liquid refrigerant to enter evaporator 58 thus allowing the evaporator to absorb heat more efficiently. It should be noted that instead of a diffuser, any means for slowing the velocity of refrigerant flow may be used; for example, a sudden or immediate expansion of the conduit at the same general location of the diffuser.

Figure 8:
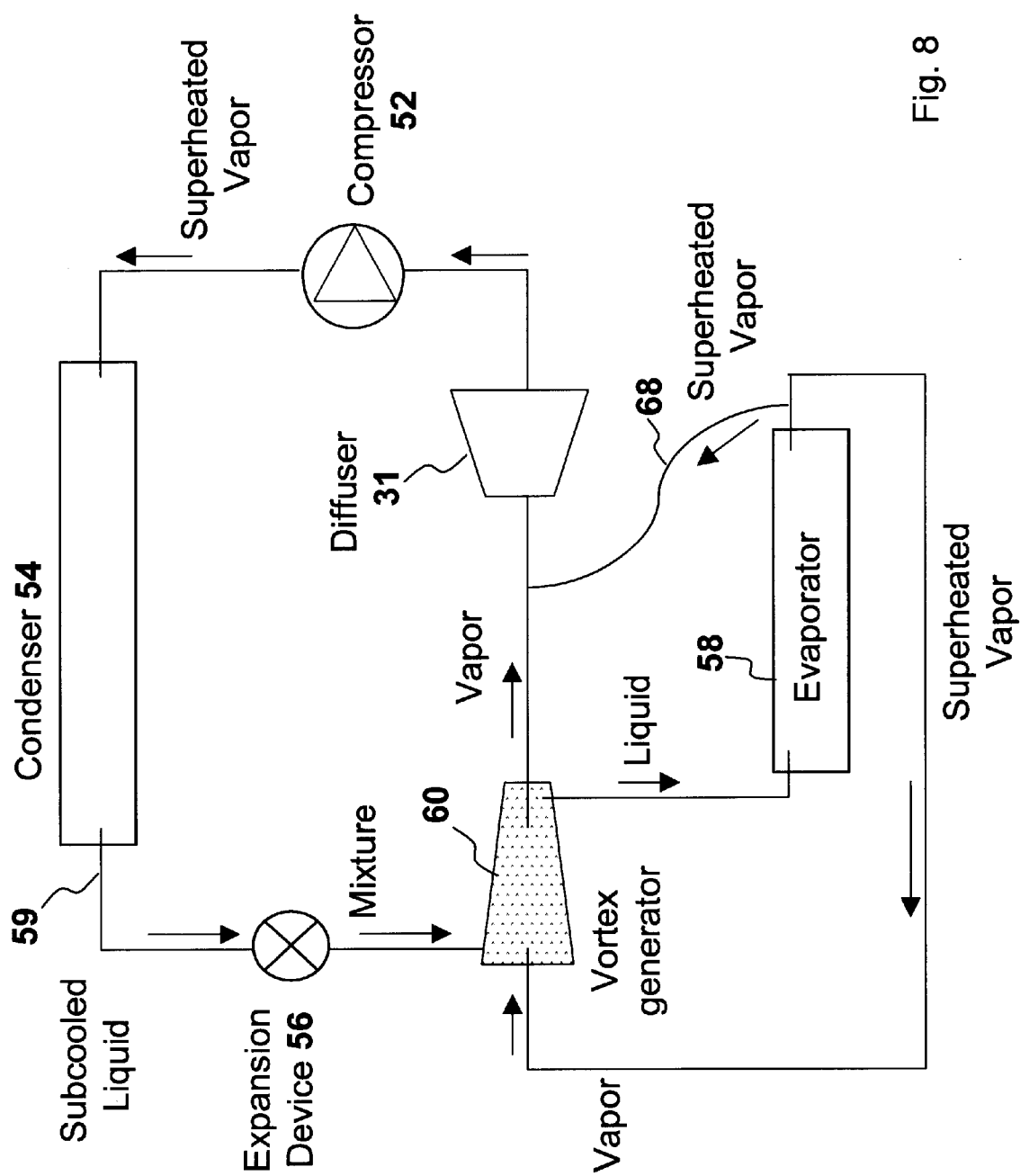
FIG. 8 is a block diagram of another embodiment of a refrigeration system in accordance with the present invention utilizing a vortex generator, a diffuser and a branch connection proximate the evaporator.

Referring now to FIG. 8, another refrigeration system, similar to that disclosed in FIG. 2, is illustrated. A branch tube 68 is connected from the output of the evaporator to the inlet of the diffuser 31. A portion of the vapor refrigerant that exits the evaporator enters the diffuser 31 in order to increase the level of superheat, when necessary.

In the embodiments illustrated in FIGS. 2 and 8, an increase in the heat absorption is achieved since only the liquid refrigerant passes through evaporator 58; this results in an increase in efficiency (EER) of the refrigeration cycle. Diffuser 31 also ensures that the pressure differential and thus compression ratio decrease in compressor 52; this also improves the efficiency (EER) of the refrigeration cycle.

Figure 9:
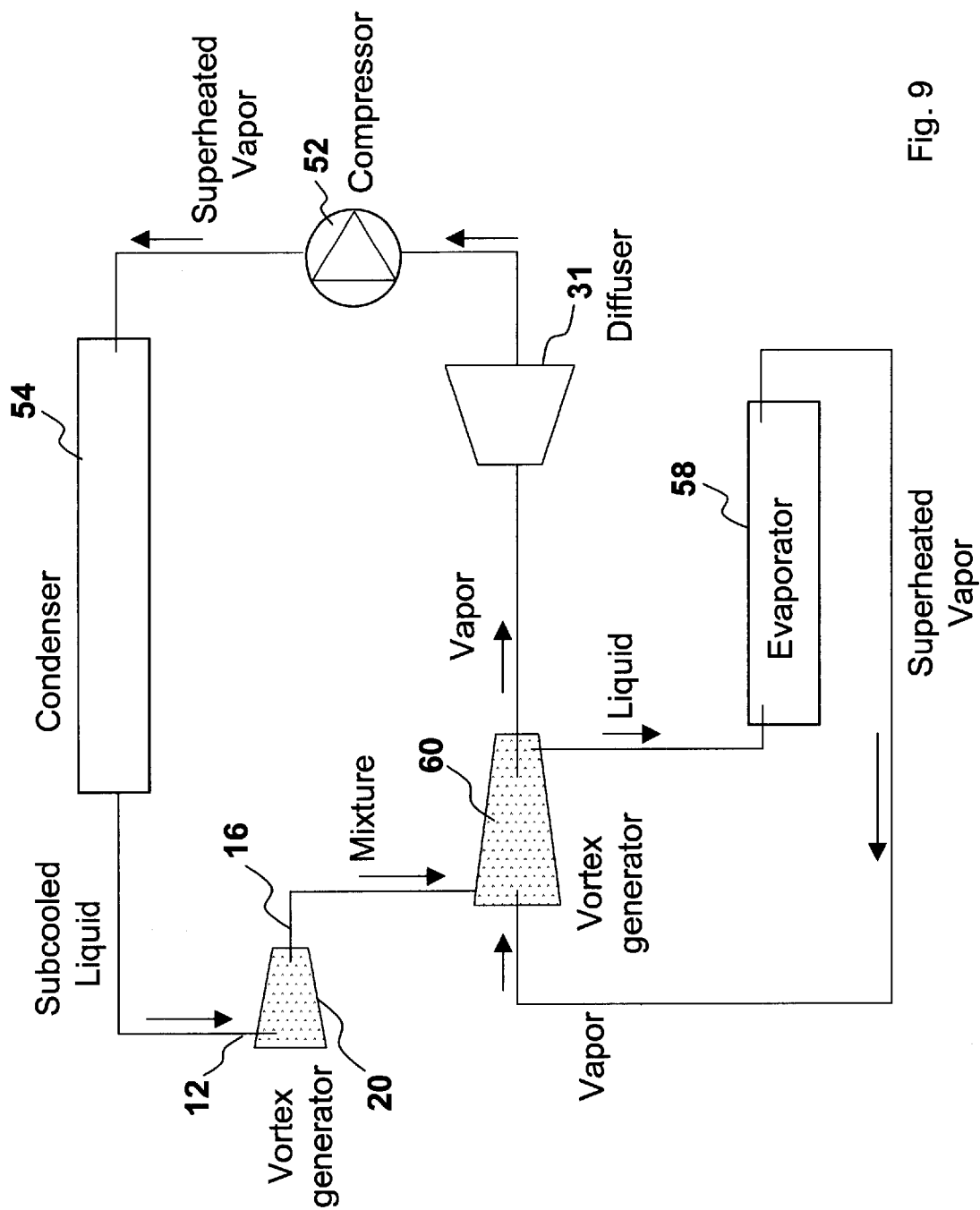
FIG. 9 is a block diagram of another embodiment of a refrigeration system in accordance with the present invention similar to the system of FIG. 2, but utilizing a vortex generator in place of the expansion device.

Referring now to FIG. 9, another refrigeration system, similar to that disclosed in FIG. 2, is illustrated. In this embodiment, the expansion device has been replaced with a single inlet, single outlet vortex generator 20 similar to that illustrated in FIG. 3. In many typical refrigeration systems, the expansion device is a capillary tube or a thermal expansion valve. The vortex generator 20 in this embodiment is used to throttle the refrigerant vapor that exits the condenser 54.

Figure 10:
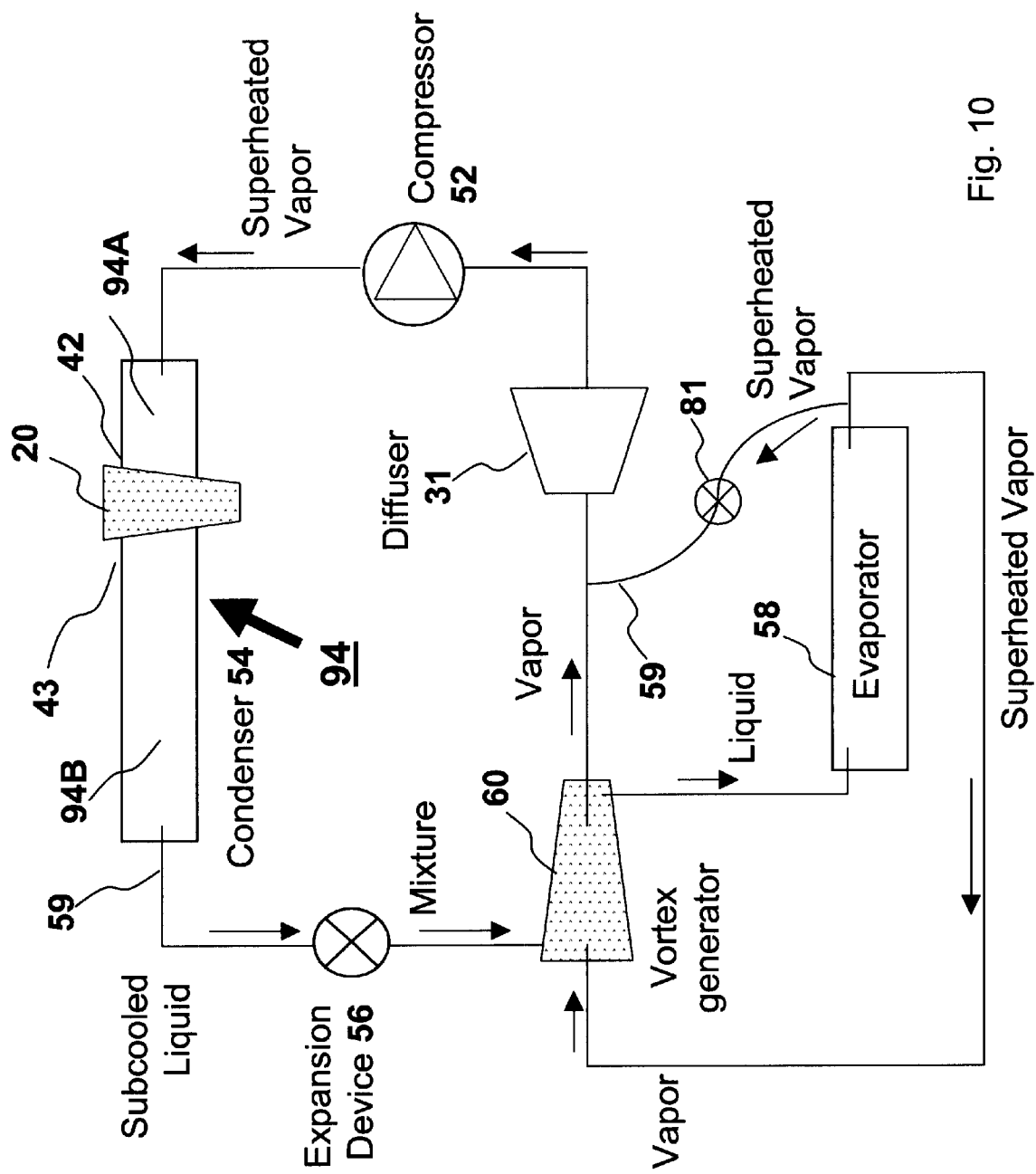
FIG. 10 is a block diagram of another embodiment of a refrigeration system in accordance with the present invention utilizing a vortex generator in the condenser and a branch connection proximate the evaporator.

Referring now to FIG. 10, another embodiment of a refrigeration system with a modified condenser 94 is illustrated. Since the heat rejection from the condenser to the surroundings can occur only when the temperature of the refrigerant is greater than that of the surroundings, the refrigerant temperature has to be raised well above that of the surroundings. This is accomplished by raising the pressure of the refrigerant vapor, a task that is done by the compressor 52. Since vapor temperature is closely related to vapor pressure, it is critically important that the condenser efficiently rejects heat from the refrigerant to the surroundings. If the condenser 94 is not efficient, the compressor 52 has to further increase the head pressure in an attempt to assist the condenser in dumping heat to the surroundings.

As illustrated in FIG. 10, another embodiment of the present invention utilizes a vortex generator 20 in the condenser to convert saturated refrigerant vapor to liquid thus increasing the condenser's efficiency. The first approximately one-quarter of the condenser is represented by 94A and the remaining approximately three-quarters of the condenser is represented by 94B.

A condenser 54 in a "typical" refrigeration system is used to convert superheated refrigerant vapor to liquid by rejecting heat to the surroundings. The condenser is a long heat transfer coil or series of heat rejecting panels similar in appearance to the evaporator. As refrigerant enters a "typical" condenser, the superheated vapor first becomes saturated vapor in the approximately first quarter-section of the condenser, and the saturated vapor undergoes a phase change in the remainder of the condenser at approximately constant pressure.

In this embodiment of the invention, the vortex generator 20 is inserted approximately one-quarter of the way into the condenser 94 (i.e., at the point where the superheated vapor becomes saturated vapor in full or in part). By inserting the vortex generator 20 in an existing condenser, manufacturing costs of the installation of the vortex generator 20 may be minimized. However, for all intents and purposes two separate condensers, each about the respective size of condenser portions 94A and 94B, may be used.

When a vortex generator 20 is placed approximately one-fourth of the way from the inlet of the condenser, the temperature of the refrigerant does not have to be raised well over that of the surroundings thus allowing the compressor to run at a lower head pressure than would be the case without the vortex generator 20.

Since the refrigerant vapor becomes saturated or subcooled liquid at the output of the condenser, the size of the condenser in prior art refrigeration systems is often chosen larger than necessary in order to ensure the exchange of heat. The present method allows the size of the condenser 94 to be reduced because the substantial amount of saturated refrigerant vapor is converted to liquid by the vortex generator 20. The present invention allows the use of a smaller condenser than is the case without a vortex generator 20 thereby reducing the size of air conditioning systems, refrigerators and heat pumps.

FIG. 10 also illustrates the use of valve 81 located on the branch tube 68 to control the flow of vapor refrigerant from the evaporator to the diffuser 31.

Although this invention has been described and illustrated by reference to specific embodiments, it will be apparent to those skilled in the art that various changes and modifications may be made which clearly fall within the scope of this invention. The present invention is intended to be protected broadly within the spirit and scope of the appended claims.

We claim:

1. A refrigeration system having a compressor, a condenser, an expansion device and an evaporator arranged in succession and connected via conduit in a closed loop in order to circulate refrigerant through the closed loop, the refrigeration system comprising means for decreasing pressure differential across the compressor, thus decreasing compression ratio in the compressor wherein said means for decreasing comprises a vortex generator and a means for slowing refrigerant flow, in combination, that communicate with the expansion device, the evaporator and the compressor for increasing the inlet pressure of the compressor.

2. The refrigeration system of claim 1 wherein said means for slowing refrigerant flow is a diffuser.

3. The refrigeration system of claim 1 wherein said means for slowing refrigerant flow is a sudden expansion of the conduit.

4. The refrigeration system of claim 1 wherein said vortex generator utilizes a center delivery for introducing recirculated refrigerant from the evaporator directly into the vortex flow.

5. A refrigeration system comprising:
a compressor;
a condenser;
an expansion device; and
an evaporator, all arranged in succession and communicating via conduit in a closed loop in order to circulate refrigerant through the closed loop;
a vortex generator for separating a stream of refrigerant under relatively high pressure into a vapor component and a liquid component, said vortex generator placed in the closed loop between the expansion device and the evaporator for accelerating the refrigerant vapor to a very high velocity at the exit of said vortex generator; and
a diffuser placed between the vortex generator and the compressor for increasing the pressure of the refrigerant before the refrigerant enters the compressor thereby reducing the pressure differential across the compressor and the compression ratio in the compressor.

6. The refrigeration system of claim 5 wherein said vortex generator has a primary input, a secondary input, a vapor output and a liquid output, such that the output of the expansion device is connected to the primary input of the vortex generator, the vapor output of the vortex generator is connected to the input of the diffuser, the liquid output of the vortex generator is connected to the evaporator and the output of the evaporator is connected to the secondary input of the vortex generator.

7. The refrigeration system of claim 5 further comprises a second vortex generator having an inlet and an outlet placed about one-fourth of the way in to the condenser.

8. The refrigeration system of claim 7 wherein said expansion device is a third vortex generator having an inlet and an outlet.

9. The refrigeration system of claim 5 wherein said expansion device is a first vortex generator having an inlet and an outlet.

10. The refrigeration system of claim 5, wherein said expansion device is a capillary tube for adjusting the pressure of the refrigerant that passes therethrough.

11. The refrigeration system of claim 5 wherein said vortex generator has a center delivery for introducing recirculated refrigerant directly into the vortex flow.

12. A refrigeration system comprising:
a compressor having an inlet and an outlet;
a condenser having an inlet and an outlet, said condenser connected to the compressor via a first tube;
an expansion device having an inlet and an outlet, the inlet of the expansion device connected to the outlet of the condenser via a second tube;
a vortex generator for separating a stream of refrigerant into a vapor component and a liquid, said vortex generator having a primary input, a secondary input, a vapor output and a liquid output, such that the outlet of the expansion device is connected to the primary input of the vortex generator via a third tube;
an evaporator having an inlet and an outlet, the liquid outlet of the vortex generator being connected to the inlet of the evaporator via a fourth tube, and the outlet of the evaporator connected to the secondary input of the vortex generator via a fifth tube;
a diffuser having an inlet and an outlet, the vapor outlet of the vortex generator connected to the inlet of the diffuser via sixth tube, and the outlet of the diffuser connected to the inlet of the compressor via a seventh tube, the vortex generator and the diffuser increasing the pressure of the refrigerant entering the compressor thereby reducing the pressure differential across the compressor and the compression ratio in compressor.

13. The refrigeration system of claim 12, further comprising a bypass tube connecting the outlet of the evaporator to the inlet of the diffuser (i.e., connecting the fifth tube to the sixth tube).

14. The refrigeration system of claim 13, further comprising a valve in the bypass tube for regulating the amount of refrigerant that passes through the bypass tube.

15. The refrigeration system of claim 13, further comprising a second vortex generator having an inlet and an outlet placed about one-fourth of the way in to the condenser.

16. The refrigeration system of claim 13, wherein said expansion device is a third vortex generator having an inlet and an outlet.

17. The refrigeration system of claim 12, wherein said expansion device is a vortex generator having an inlet and an outlet.

18. The refrigeration system of claim 12, wherein said expansion device is a capillary tube for adjusting the pressure of the refrigerant that passes therethrough.

19. A method of improving the efficiency of a refrigeration system, the refrigeration system having a compressor, a condenser, an expansion device, and,-an evaporator, and a diffuser arranged in succession and connected via conduit in a closed loop in order to circulate refrigerant through the closed loop, the method comprising the steps of:

a) separating a stream of refrigerant exiting the expansion device using vortex generator into a vapor component and a liquid component;

b) directing the liquid component to the evaporator;

c) directing the high velocity vapor component exiting from vortex generator to a means for slowing the velocity of refrigerant flow and for increasing the pressure on the refrigerant before the refrigerant enters the compressor, thereby decreasing the pressure differential across the compressor and the compression ratio in compressor.

20. The method of claim 19 wherein said means for slowing refrigerant flow comprises the step of directing the refrigerant into a diffuser.

21. The method of claim 19 wherein said means for slowing refrigerant flow is a sudden expansion of the conduit.

22. The method of claim 19 further comprising the step of directing a portion of the recirculated refrigerant from the evaportor through a central delivery of the vortex generator directly into the vortex flow.

* * * * *